United States Patent
Tarascon et al.

(10) Patent No.: US 12,519,106 B2
(45) Date of Patent: Jan. 6, 2026

(54) USE OF A TRANSITION METAL SULPHIDE COMPOUND IN A POSITIVE ELECTRODE FOR SOLID STATE BATTERIES

(71) Applicants: CENTRE NATIONAL DE LA RECHERCHE SCIENTIFIQUE, Paris (FR); COLLEGE DE FRANCE, Paris (FR); SORBONNE UNIVERSITE, Paris (FR)

(72) Inventors: Jean-Marie Tarascon, Paris (FR); Florencia Marchini, Paris (FR)

(73) Assignees: CENTRE NATIONAL DE LA RECHERCHE SCIENTIFIQUE, Paris (FR); COLLÉGE DE FRANCE, Paris (FR); SORBONNE UNIVERSITÉ, Paris (FR)

( * ) Notice: Subject to any disclaimer, the term of this patent is extended or adjusted under 35 U.S.C. 154(b) by 858 days.

(21) Appl. No.: 17/765,922

(22) PCT Filed: Oct. 1, 2020

(86) PCT No.: PCT/EP2020/077553
§ 371 (c)(1),
(2) Date: Apr. 1, 2022

(87) PCT Pub. No.: WO2021/064117
PCT Pub. Date: Apr. 8, 2021

(65) Prior Publication Data
US 2022/0376251 A1  Nov. 24, 2022

(30) Foreign Application Priority Data
Oct. 1, 2019  (EP) .................... 19306253

(51) Int. Cl.
*H01M 4/58*  (2010.01)
*H01M 4/505*  (2010.01)
(Continued)

(52) U.S. Cl.
CPC ......... *H01M 4/5815* (2013.01); *H01M 4/505* (2013.01); *H01M 4/525* (2013.01); *H01M 10/0525* (2013.01); *H01M 2004/028* (2013.01)

(58) Field of Classification Search
CPC . H01M 2300/0065; H01M 2300/0068; H01M 2300/0071; H01M 10/0562; H01M 4/5815
See application file for complete search history.

(56) References Cited

U.S. PATENT DOCUMENTS

| | | | |
|---|---|---|---|
| 6,368,746 B1 * | 4/2002 | Takada | H01M 4/621 429/208 |
| 2004/0180134 A1 * | 9/2004 | Kweon | H01M 4/1391 429/231.95 |

(Continued)

FOREIGN PATENT DOCUMENTS

| | | |
|---|---|---|
| JP | 2008-251520 A | 10/2008 |
| JP | 2017-054633 A | 3/2017 |

(Continued)

OTHER PUBLICATIONS

JP2017142950 English translation. Tamura et al. Japan. Aug. 17, 2017. (Year: 2017).*

(Continued)

*Primary Examiner* — Christopher P Domone
(74) *Attorney, Agent, or Firm* — Scully, Scott, Murphy & Presser, P.C.

(57) ABSTRACT

The present invention generally relates to the use of a transition metal sulphide compound in a positive electrode for solid state batteries, to a transition metal sulphide compound, to a device or a material incorporating said compound, such as a composite material, an electrode, an electrochemical energy storage cell or a device such as an all-solid-state battery. It further relates to a method to (Continued)

manufacture and/or to use such a compound, material or device and to a process to manufacture said compound, material and/or device.

19 Claims, 6 Drawing Sheets

(51) Int. Cl.
  *H01M 4/525* (2010.01)
  *H01M 10/0525* (2010.01)
  *H01M 4/02* (2006.01)

(56) References Cited

U.S. PATENT DOCUMENTS

2011/0318652 A1 12/2011 Furuya
2017/0025705 A1 1/2017 Miara et al.
2019/0140265 A1 5/2019 Miara et al.

FOREIGN PATENT DOCUMENTS

JP 2017142950 A 8/2017
WO 2010/043886 A2 4/2010

OTHER PUBLICATIONS

International Search Report dated Dec. 18, 2020 issued in PCT/EP2020/077553.
Abstract only of JP H10208782, dated Aug. 7, 1998.
Janek, J. et al., "A solid future for battery development", Nat. Energy (Sep. 8, 2016), vol. 1, pp. 1-4.
Kanno, R. et al., "Lithium Ionic Conductor Thio-LISICON: The Li2S—GeS2—P2S5 System", Journal of The Electrochemical Society (2001), vol. 148, Issue 7, pp. A742-A746.
Kamaya, N. et al., "A lithium superionic conductor", Nature Materials (Sep. 2011), vol. 10, pp. 682-686.
Koerver, R. et al., "Redox-active positive electrode interphases in solid-state batteries", J. Mater. Chem. A5 (2017), pp. 22750-22760.
Takada, K. et al., "Interfacial phenomena in solid-state lithium battery with sulphide solid electrolyte", Solid State Ionics 225 (2012), pp. 594-597.
Haruyama, J. et al., "Charge Layer Effect at Interface between Oxide Positive electrode and Sulfide Electrolyte in All-Solid-State Lithium-Ion Battery", Chem. Mater. 26 (2014), pp. 4248-4255.
Culver S.P. et al., "On the Functionality of Coatings for Positive electrode Active Materials in Thiophosphate-Based All-Solid-State Batteries", Adv. Energy Mater. (2019). doi:10.1002/aenm. 201900626, pp. 1-14.
Xiao Y. et al., "Computational Screening of Positive electrode Coatings for Solid-State Batteries", Joule 3 (May 15, 2019), doi:10. 1016/j.joule.2019.02.006, pp. 1-24.
Liu, Z. et al., "Anomalous high ionic conductivity of nanoporous beta-Li3PS4", J. Am. Chem. Soc. 135 (2013), pp. 975-978.
Busche, M.R. et al., "In Situ Monitoring of Fast Li-Ion Conductor Li7P3S11 Crystallization Inside a Hot-Press Setup", Chem. Mater. 28 (2016), pp. 6152-6165.
Zheng, W. et al., "Interfacial Processes and Influence of Composite Positive electrode Microstructure Controlling the Performance of All-Solid-State Lithium Batteries", ACS Appl. Mater. Interfaces 9 (2017), pp. 17835-17845.
Takada, K. et al., "Lithium iron sulphide as an electrode material in a solid state lithium battery", Solid State Ionics (Feb. 2, 1999), vol. 117, Issues 3-4, pp. 273-276.
Sakuda, A. et al., "Rock-salt-type lithium metal sulphides as novel positive-electrode materials", Scientific Reports (2014), pp. 1-5.
Notice of Reasons for Refusal dated Oct. 29, 2024 received in Japanese Patent Application No. 2022-520342, 11 pages.
Clark S.J. et al., "Li(V0.5Ti0.5)S2 as a 1V Lithium Intercalation Electrode", Nature Communications 7:10898 (2016) (cited in JP Notice of Reasons for Rejection).
Li B. et al., "Thermodynamic Activation of Charge Transfer in Anionic Redox Process for Li-Ion Batteries", Advanced Functional Materials 28:1704864 (2018) (cited in JP Notice of Reasons for Rejection).
Tarascon J.M. et al., "Preparation and Chemical and Physical Properties of the New Layered Phases LixTi1-yMyS2 With M=V, Cr, or Fe", Physical Review B 28(11): 6397-6406 (Dec. 1983) (cited in JP Notice of Reasons for Rejection).
Japanese Notice of Reasons for Rejection dated Apr. 22, 2025 received in Japanese Patent Application No. 2022-520342, together with an English-language translation.

\* cited by examiner

USE OF A TRANSITION METAL SULPHIDE COMPOUND IN A POSITIVE ELECTRODE FOR SOLID STATE BATTERIES

FIELD OF THE INVENTION

The present invention generally relates to the use of a transition metal sulphide compound in a positive electrode for solid state batteries, to a transition metalsulphide compound, to a device or a material incorporating said compound, such as a composite material, an electrode, an electrochemical energy storage cell or a device such as an all-solid-state battery. It further relates to a method to manufacture and/or to use such a compound, material or device and to a process to manufacture said compound, material and/or device.

BACKGROUND OF THE INVENTION

As the importance of developing efficient energy storage technologies for portable electronics continues to increase, so is the incentive to develop high energy density Lithium-ion (Li-ion) batteries.

In this regard, solid-state batteries (SSB), wherein the electrolyte is in a solid state and not a liquid or a gel, are suitable for reaching a suitably high energy density. Indeed, a solid electrolyte (SE) enables the use of high voltage positive electrode materials and alkali metal negative electrodes which comprise lithium metal. In particular, the solid-electrolyte allows to prevent the formation of dendrites which occurs during repeated shuttling of lithium between the two electrodes (positive and negative), owing to a non-uniform current distribution. In addition, the solid-state battery does not require any separator as fora lithium-ion battery using a liquid electrolyte for stacking electrochemical cells. Thus, a bipolar stacked configuration with reduced spacing between each couple of single cells and current collectors with lower thickness has become possible for the solid-state battery. Therefore, the solid-state batteries allow reducing the weight and volume of the battery required to achieve a higher energy density (cf. Janek, J et. al).

However, solid-state batteries suffer from poor ionic percolation pathways between the active material and the solid-electrolyte, unlike batteries using a liquid electrolyte, wherein the electrolyte penetrates the porous electrodes and therefore provides good ionic percolation pathways (cf. Kalaya, N. et al).

In this regard, Kanno et al. have suggested in "A lithium superionic conductor" *Nature Materials*. 10, 682-686 (2011) using $Li_{10}GeP_2S_{12}$ as a solid electrolyte, with a conductivity equivalent to that of today Li-ion liquid electrolyte ($10^{-2}$ S/cm). However, it was found that germanium in the solid-electrolyte compromises the chemical compatibility with metallic lithium. In addition, germanium is a high cost raw material which impedes its large-scale implementation in Li-ion batteries.

Some lithium SSB's configurations comprise the use of layered oxide materials, such as $LiNi_xMn_yCo_zO_2$(NMC), $Li_{1-x}MnO_2$(LMO) and $Li_{1-x}CoO_2$(LCO), as a positive electrode material, and a sulphide based solid-electrolyte, such as $Li_3PS_4$ which shows a better compatibility with lithium metal (or its alloy such as lithium-indium alloy) used as the negative electrode. This is the case in Koerver, R. et al. in "Redox-active positive electrode interphases in solid-state batteries" *J. Mater. Chem. A* 5, 22750-22760 (2017), grinded a layer oxide $LiNi_{0.8}Mn_{0.1}Co_{0.1}O_2$(NMC-811) and a sulphide solid-electrolyte $\beta$-$Li_3PS_4$ together to obtain a positive electrode active material, for the purpose of having a better compatibility between the positive electrode active material and the sulphide solid-electrolyte. The solid-state battery comprises:
- a grinded mixture of 70 wt. % NMC-811 and 30 wt. % of solid-electrolyte $\beta$-$Li_3PS_4$ as the positive electrode active material,
- $\beta$-$Li_3PS_4$ as the solid electrolyte, and
- an indium foil as negative electrode active material (at pristine state, after first charge, a lithium-indium alloy is formed).

Koerver et al. observed that this configuration does still not prevent from the degradation of the solid electrolyte when working at a higher voltage limit (above 4.0 V vs. Li/Li$^+$). Moreover, in this configuration, the interface between the positive electrode and the solid-electrolyte remains poor due to:
- an ionically depleted zone resulting from the greater ability of $O^{2-}$ to attract $Li^+$ at the surface of the solid-electrolyte; and/or
- chemical reactivity of the layered oxide with regard to the electrolyte.

To alleviate the issue about the depleted zone, oxide coatings such as $LiNbO_3$, $ZrO_3$ enrobing Li-based layered oxides were proposed (cf. Culver, S. P. et al. and Xiao, Y. et al). The oxide coatings were supposed not to present the formation of the ionically depleted zone.

However, such oxide coatings have not demonstrated such effectiveness when used with sulphide electrolyte. Indeed, Xiao, Y. et al. in "Computational Screening of Positive electrode Coatings for Solid-State Batteries" *Joule* (2019) do not recommend the use of oxide coatings such as $LiNbO_3$ with sulphide solid-electrolyte, such as $\beta$-$Li_3PS_4$, because of its high chemical reactivity.

Furthermore, Culver, S. P. et al. in "On the Functionality of Coatings for Positive electrode Active Materials in Thiophosphate-Based All-Solid-State Batteries." *Adv. Energy Mater.* (2019) also teach that the coating of layered oxides, such as NMC or LCO, with sulphides, such as thiophosphates or even metals, does not alleviate the issues relating to the instability of these sulphides against the layered oxides at high voltages.

DESCRIPTION OF THE INVENTION

It is therefore an object of the invention to provide a new electroactive compound which can master the oxide positive electrode material/sulphide solid electrolyte interface, and electrochemical energy storage devices containing such a material. It is another object of the invention to provide a compound and/or a material (e.g. a composite material) which would overcome one or several of these drawbacks of the materials and devices of the state of the art and/or has one or more of the following properties:
- being chemically stable, in particular when compared to the oxide compounds or material used in the SSB technology (neat oxide-sulphide interface);
- obtaining an interface or a compound allowing the intercalation of lithium (or being electrochemically active); and
- being electrochemically stable, and furthermore being electrochemically stable over the operating voltage range of a commercialized oxide, (e.g. 3V-4.3 V vs. Li/Li$^+$).

Twenty years ago, $Li_xFeS_2$ was disclosed as a possible negative electrode active material in a solid state lithium battery (cf. Takada et al.). However, the use of such a material (FeS$_2$) proved to be inconclusive as the material was instable at room temperature.

It has now been found that mixing transition metal sulphide compound, preferably lithium based, (hereafter referred as Li-active sulphide or a Li-insertion sulphide), with a layered oxide compound (hereafter referred as Li-active oxide or a Li-insertion oxide), provides at least one, and preferably more of the above-mentioned desirable properties. It was also found that a particular transition metal sulphide compound can also be used by itself as a stable material for a positive electrode of a solid state battery (SSB). By "active material" it is meant that the material enables the reversible exchange of ions (e.g. Li$^+$) either by intercalation or conversion reactions.

A first aspect of the invention is therefore the use of, or the process of using, a ternary (often called "tertiary") transition metal sulphide compound, which is preferably a chalcogenide compound, and is further associated with (i.e. comprising) an alkali metal (hereinafter an "alkali") such as lithium, sodium and potassium, as an active material for a positive electrode of a solid state battery. According to this aspect of the invention, the ternary transition metal compound of the invention may have only one transition metal. In this particular case the transition metal is chosen in the group consisting of Sc, Ti, V, Cr, Mn, Fe, Co, Ni, Cu, Y, Zr, Nb, Mo, Tc, Rh, Pd, Ag, Hf, Ta, W, Re, Os, Ir, Pt, Au, Rf, db, Sg, Bh, Hs and Cn. Transition metals which can form layered sulphides are preferred. In particular, Iron, Titanium, Manganese, Nickel, Vanadium and a combination thereof are preferred metals. Preferably the transition metal sulphide compound of the invention comprises at least two transition metals.

The ternary metal sulphide compound is preferably a layered sulphide compound such as Li$_2$TiS$_3$.

By "tertiary transition metal sulphide compound" or "ternary transition metal compound" it is meant a compound having an empirical formula I having the elementary formula $A_xB_bS_z$, wherein A is at least an alkali and "x" is the atomic content (per formula unit) of this or these alkali. It is preferred that A is a single element. It is further preferred that the alkali is chosen in the group of Li, Na or K. Lithium is a preferred alkali, in particular for use in solid state lithium batteries. The ratio x is a number 0<x<3. When the alkali is lithium, the number "x" is preferably chosen in the range from 0.8 to 2.5 or x is 0.8<x<2. Preferably x is equal to 1 or 2. The ratio x can further be chosen in the in the range of 0.9 to 1.5.

B is at least one transition metal, and preferably two or more. The atomic content b of the transition metal(s) is preferably ranging from 0.5 to 3, preferably 1 to 3. It can advantageously be 1, 2 or 3. This transition metal compound advantageously further comprises at least one alkali compound. The metal atomic element content can be measured by atomic emission spectroscopy.

In order to achieve the operating voltage range of a commercialized oxide it is also preferred that B is at least two different transition metals. In this case it is also preferred that the transition metal sulphide is a non-stoichiometric compound. When B$_b$ is a least two transition metals, B can have the empiric formula M$_y$N$_w$, wherein M and N are different, and preferably abundant, transition metals and y and w are the atomic content of the element(s) M and N, respectively.

"z" is the atomic content of sulphur and is equal to x+b.

It is also preferred that the transition metal sulphide of the invention be in the form of a powder, advantageously a thin powder. By thin powder it is meant that the size of the particles of the powder, or the average particle diameter D$_{50}$, is less than 5 microns, advantageously less than 2 microns, when measured by standard laser diffraction methods.

According to a preferred embodiment, a solid electrolyte (i.e. ionic conductor) material can be mixed with ternary transition metal sulphide compound to form an active electrode material. Said solid electrolyte material can be of any type such as ceramic or polymer but is advantageously a sulphide compound such as lithium sulphide, silicon sulphide, phosphorous sulphide, in particular a thiophosphate, boron sulphide or a mixture thereof. For example, the sulphide, or sulphide-based, electrolyte can comprise a compound selected in the group consisting of component such as SiS$_2$, GeS$_2$, B$_2$S$_3$, Li$_7$GeP$_2$S$_{10}$, Li$_7$GePSI—Cl (or argyrodite), amorphous (or glassy) Li$_3$PS$_4$, crystallisedβ-Li$_3$PS$_4$ and mixtures thereof. β-Li$_3$PS$_4$ is particularly preferred.

The relative weight proportion of the ternary transition metal sulphide over the solid electrolyte may range from 0.5 to 4, preferably from 1 to 3 and more preferably from 1.8 to 2.7 (e.g. 70:30).

An electrode, in particular a positive electrode which comprises a transition metal sulphide compound as described in reference to the first aspect of the invention is also an object of the invention. A further object of the invention is an electrochemical cell or a battery, in particular a solid state battery, preferably a lithium battery, which comprises a positive electrode as defined above. Said cell, or battery, further comprises a negative electrode and an electrolyte. A further object of the invention is a method of manufacturing a positive electrode, an electrochemical cell or a battery, in particular a solid state battery, preferably a lithium battery, which comprises the step of providing a transition metal sulphide as described in reference to this first aspect of the invention and manufacturing an electrode, a cell and/or a battery containing it.

A second aspect of the invention is the use of, or the process of using, a transition metal sulphide compound, which is preferably a chalcogenide compound, in association or combination with an oxide compound, preferably is a Li-insertion oxide or Na-insertion oxide, as an active material for an electrode of a solid state battery. This association between the oxide and sulphide is called a composite material; said composite material is also an object of the invention. According to this second aspect of the invention, the transition metal sulphide has the empirical formula II B$_b$S$_z$, wherein S is sulphur and B can comprise one, two or more transition metals chosen in the group consisting of Sc, Ti, V, Cr, Mn, Fe, Co, Ni, Cu, Y, Zr, Nb, Mo, Tc, Rh, Pd, Ag, Hf, Ta, W, Re, Os, Ir, Pt, Au, Rf, db, Sg, Bh, Hs and Cn. A transition metal which can form layered sulphides is preferred. When the transition metal sulphide comprises a single transition metal, it is preferred that the compound is a stoichiometric compound. It is further preferred that the transition metal is a transition metal is chosen in the group consisting of Titanium, Iron, Manganese, Nickel and Vanadium.

The transition metal sulphide compound which can be used according to the second aspect of the invention is advantageously a compound of formula II: B$_b$S$_z$. In Formula II, S is sulphur and "z" represents the atomic content of this element and is a number ranging from about 1 to 3. Preferably "z" is a number ranging from 0.9 to 1.1, 1.9 to 2.1 or 2.9 to 3.1, or 3.9 to 4.1. In particular z can be equal to 1, 2 or 3.

B is at least one transition metal, and preferably two or more. The atomic content b of the transition metal(s) is preferably ranging from about 1 to 2. It can advantageously be 1 or 2. The metal atomic element content can be measured by atomic emission spectroscopy.

This transition metal compound advantageously further comprises at least one alkali compound. Such a ternary compound may have the elementary formula I $A_b b_e S_s$, wherein A, B and S is as defined in respect of formula I.

In order to achieve the operating voltage range of a commercialized oxide it is also preferred that B is at least two different transition metals. In this case it is also preferred that the transition metal sulphide is a non-stoichiometric compound. When $B_b$ is a least two transition metals, B can have the empiric formula $M_y N_w$, wherein M and N are different, and preferably abundant, transition metals and y and w are the atomic content of the element(s) M and N, respectively. It is also preferred that the transition metal sulphide of the invention be in the form of a powder, advantageously a thin powder. By thin powder it is meant that the average size of the particles of the powder (or a median particle diameter $D_{50}$) is less than 5 μm, preferably less than 2 microns when measured by laser diffraction methods.

The oxide material is an active oxide compound, or combination thereof, which can be of the type used in the SSB technology such as oxides, layered oxide or Spinel type material. With particular reference to solid state lithium battery, such oxide is generally of the empiric formula $A_x C_c O_z$ with O being oxygen and x defined above, c is a number ranging from 1 to 3 and z is equal to x+c. A is an alkali, such as Li, Na or K, preferably lithium. C comprises at least one element from the group 2 to Group 13, in particular C may comprise at least one transition metal oxide. The oxide active material can be a non-stoichiometric transition metal oxide. For example, such an oxide material can be a Lithium Nickel Manganese Cobalt Oxide (LNMC oxide), such as $LiNi_{0.6}Mn_{0.2}Co_{0.2}O_2$ or $Li(Ni_{0.33}Mn_{0.33}Co_{0.33})O_2$, a Lithium Cobalt Oxide (LC oxide), a Lithium Manganese Oxide (LM oxide), $LiFePO_4$, $LiNiMnO_2$, or a mixture thereof. With reference to solid state lithium or sodium battery, the oxide may further be of the formula $A_{3+d}Cl_{1-d}D_dO$ wherein d is greater than zero, A is at least Li and Na and D is at least one of S, Se and N. The oxide material is usually in the form of a powder of particles. The size of the particles of the powder, or the average particle diameter $D_{50}$, is preferably less than 20 microns, advantageously less than 10 microns, when measured by standard laser diffraction methods.

Another object of the invention according to the second aspect of the invention, is a composite material which comprises a mixture or a combination of a layered, or active, oxide material and a transition metal sulphide compound as described above in reference of the second aspect of the invention, or a combination of said compounds.

The composite material advantageously comprises an intimate combination of the sulphide and the oxide. This intimate combination may comprise a mixed powder which can be obtained by the mixing, milling and/or grinding of both materials. Powders of the oxide and the sulphide materials are grinded together so as to obtain a powder having an average particle size (or a median particle diameter $D_{50}$), which can be 10 μm or less, preferably 2 μm or less, more preferably 1 μm or less. Preferably it can range from 0.1 to 10 μm, preferably 1 to 10 μm, (e.g. about 2 μm) when measured by laser diffraction methods. When used as a mixed power, the sulphide to be used is preferably a sulphide comprising an alkali such as defined in formula I. The alkali to be chosen is the one corresponding to the ionic species (Li+, Na+, Ca+) which will be used as the ions being exchanged between the electrodes of the SSB.

The relative proportion by weight of the oxide to the transition metal sulphide in the composite material of the invention can range from 0.1 to 30, preferably from 0.7 to 15, more preferably from 0.1 to 1.2 or from 1 to 15 (e.g. around 1:1 or 9:1).

The composite material may comprise a mixed powder as described above and/or particles having a core and a coating layer, wherein the core comprise the layered, or active, oxide material and the coating layer comprise the transition metal sulphide compound. The composite material can be essentially constituted of these coated particles, or only comprises a portion of them or even a negligible portion of them. By essentially constituted by it is meant that more than 90% in weight of the composite is made of coated particle. It is however preferred that the composite of the invention comprise 10-70%, preferably 20-50%, especially 30 to 40% by weight of said coated particles.

The core can be of any particular shape, such as a spherical, ovoid, complex and/or aggregated shape. It is preferred that the core has an average particle size or a median particle diameter $D_{50}$, ranging from 20 to 5 μm, preferably 12 to 8 μm, preferably 11 to 9 μm (e.g. about 10 μm).

The coating layer may be only a partial coating layer and/or have an irregular shape and/or thickness. The thickness of the layer is preferably below 100 nm, preferably ranging from 1 to 10 nm. This can be measured using by using a transmission electron microscope. The coating layer acts as a protective barrier and prevents the formation of an ions depleted zone at the surface of the particle. As a coating layer the sulphide compound to be used does not necessarily comprises an alkali. A compound of formula II, without alkali, improves the oxide/electrolyte interface.

When the transition metal sulphide is a ternary compound and include an alkali, in particular lithium or sodium, then another effect is shown as the compound is electrochemically active and stable over the operating voltage range of most commercialized oxide used as positive electrode material in battery.

According to a preferred embodiment, the composite material of the second aspect of the invention can further comprise a solid electrolyte (i.e. ionic conductor) material. Said solid electrolyte material can be of any type such as ceramic or polymer but is advantageously a sulphide compound such as lithium sulphide, silicon sulphide, phosphorous sulphide such as thiophosphates, boron sulphide or a mixture thereof. For example, the sulphide, or sulphide-based, electrolyte can comprise a compound selected in the group consisting of component such as $SiS_2$, $GeS_2$, $B_2S_3$, $Li_7GeP_2S_{10}$, $Li_7GePSI$—Cl (or argyrodite), amorphous (or glassy) $Li_3PS_4$, crystallised β-$Li_3PS_4$ and mixtures thereof. β-$Li_3PS_4$ is particularly preferred.

In such an embodiment the relative weight proportion of the oxide and transition metal sulphide over the solid electrolyte may range from 0.5 to 4, preferably from 1 to 3 and more preferably from 1.8 to 2.7 (e.g. 70:30).

In one embodiment, the initial specific capacity (obtained after first discharge) of the positive electrode material ranges from 150 to 250 (mAh·g-1). This range of the specific capacity can be obtained at a charging rate (hereafter called "C-rate") ranging from C/50 to C/5. A C/50 rate corresponds to a total removal from, or insertion to, lithium ions from the compounds of the invention in 50 hours.

The composite material according to the second aspect of the invention can be manufactured by known methods.

Preferably it includes mixing particles of the layered oxide material with the transition metal sulphide which may also conveniently be in a powdered form. The mixing is advantageously carried out by mechanical milling, e.g. ball milling. When ball milling is selected, the powder to ball weight ratio can range from 1:40 to 1:20, e.g. 1:36. The rotation speed of ball mill may range from 100 to 200 rpm, e.g. 140. The duration of ball-milling may range from 1 minute to 5 hours, e.g. 30 minutes. When the composite material comprises a solid electrolyte, the composite material can be manufactured by mixing and/or grinding a powder of the electrolyte material together with a mixture of the already mixed (e.g. milled) layered oxide and transition metal sulphide composite. In order to obtain coated particles, one or combination of techniques selected among atomic layer deposition, pulsed laser deposition, spray-coating, sputtering, sol-gel methods, and pyrolysis can be used.

As shown in the examples, a ternary transition metal sulphide or a composite material according to anyone of the first and second aspect of the invention can advantageously be used in SSB technology. Hence an electrode material, preferably a positive electrode material, which comprises, consists or essentially consists of, a composite material or a ternary transition metal sulphide as described above is a further object of the invention.

The electrode material can advantageously be a compressed material, shaped into a positive electrode. This compressed material, or pellet, can be of any shape to suit its end as a component of an electrochemical cell and/or battery.

Another object of the invention is an electrochemical cell which comprises at least two electrodes (a positive and a negative one) in contact with an ionic conductor (i.e. an electrolyte). Each electrode has some electronic conductor properties. According to invention the positive electrode comprises, consists or essentially consists of a composite material according to the invention. As it is known in the art, the electrodes are configured to reversibly accept or release alkali ions such, as lithium or sodium, which are transferred by the ionic conductor (the electrolyte).

The negative electrode can comprise an active material selected in the group consisting of known active material for the negative electrode of an SSB battery. When the SSB is a lithium battery, the material can be a well-known negative electrode active material for lithium-ion batteries such as hard carbon, soft carbon, carbon black, Ketjen black, acetylene black, activated carbon, carbon nanotubes, carbon fibre, amorphous carbon, and other carbon materials. Also usable are metals, lithium-containing metals and alloys, as they can also act as a source of lithium in the battery. Suitable metals are, for example, Li, In, Cu, Si, Sn, Sb, Ge and/or their alloys. Lithium-containing metal oxides, metal nitrides, and metal sulphides are also useful, in particular in association with Ti, Mo, Sn, Fe, Sb, Co, and V. Phosphorous, or metal doped phosphorous (e.g., NiP3), can also be used. In one embodiment the active material for the negative electrode is Indium, LiIn, LixSn (e.g. $Li_{4.4}Sn$) and/or a pre-lithiated indium-copper alloy.

The electrolyte is advantageously a solid electrolyte as above described. When the composite material of the invention comprises an electrolyte material, the electrolyte, or ionic conductor, of the electrochemical cell of the invention advantageously comprises, or is, the same material.

Another object of the invention is a solid state battery which comprises at least one electrochemical cell of the invention and external connections. In an embodiment, the battery of the invention can be cycled in an allowed cut-off voltage range of 1.5-4.5 V vs. Li/Li+, preferably at a range of 1.9-4.3 V vs. Li/Li+, more preferably at a range of 2-4 V vs. Li/Li+. The cut-off voltages can be defined as the voltage at which a battery is considered as full discharged or charge, beyond which the further discharge of charge could cause harm to the battery. The battery of the invention displays good cycle performances with a low overpotential. For example, when measured at a plateau of 2.5 V vs. Li/Li+, the over potential is below 200 mV, in particular it may range from 150 to 200 mV, at room temperature (20° C.).

Advantageously the battery comprises more than one electrochemical cell, in particular it may comprise a stack of cells.

The external connections are advantageously sized and shaped in order to power electrical devices.

A particularly preferred transition metal sulphide compound to be used in both the first and second aspect of the invention is a transition metal sulphide compound of formula III: $Li_{1.33-2y/3}M_{0.67-y/3}N_yS_2$, wherein MN is a combination of two or more transition metals selected from the group consisting of Sc, Ti, V, Cr, Mn, Fe, Co, Ni, Cu, Y, Zr, Nb, Mo, Tc, Rh, Pd, Ag, Hf, Ta, W, Re, Os, Ir, Pt, Au, Rf, db, Sg, Bh, Hs and Cn. The compound of formula III comprises a combination MN of at least two transition metals, Li, M and N have each an atomic content dependent upon y, as shown in formula III, y being a number superior to 0 and not superior to 0.5, such as 0.3. When y is inferior to 0.5 it is lithium-rich component. Advantageously one of M and N is a combination of two or more of the transition metals selected in the group consisting of Ti, V, Cr, Mn, Fe, Co, Ni, Cu, Zr, Nb, Mo, Pd, Ta, W. It is also particularly preferred that M or N be Fe and/or Ti as such a compound is air and moisture stable. A compound wherein N is Ti and M is Fe is particularly preferred. In terms of atomic content, the term "about" may be understood as meaning ±0.05.

The sulphide of formula III is therefore a particularly preferred material for the use described therein and as a transition metal compound which can be part of the composite material, the positive electrode material, the electrode, the electrochemical cell, the battery, especially the solid state lithium battery, of the invention above described. It has the particular advantages of protecting the layered oxide interface, providing additional specific capacity (when compared to the layered oxide on its own) and is stable in normal condition of air, moisture and temperature.

Furthermore devices incorporating the battery according to any aspects of the invention such as microgrids stabilizing power grids, electrochemical storage devices for intermittent renewable energy (e.g. solar, wind energy), mobile storage devices for electric vehicles (e.g. motorbike, personal car, utility vehicles, buses, trucks, etc.), domestic electrical power storage devices, emergency power-supply or energy storage device for hospitals, schools, factories, computer clusters, servers, companies, and any other public and/or private buildings or infrastructure are also the object of the invention. The composite material according to any aspect of the invention or a device incorporating said material can be of use in the following industries: automobile, computer, banking, video game, leisure, creative, cultural, cosmetic, life science, aviation, pharmaceutical, metal and steel, rail, military, nuclear, naval, space, food, agriculture, construction, glass, cement, textile, packaging, electronics, petrochemical, and chemical industries.

BRIEF DESCRIPTION OF THE DRAWINGS

A particular embodiment of the present invention will now be described with reference to the following figures in which.

EXAMPLES

Examples 1 to 5 relate to the manufacture of various compounds, materials and electrochemical cells and a description of the device used to make and test them.

Examples 6 to 10 demonstrate, inter alia, that the Li-active sulphide material is electrochemically active and remains chemically stable and electrochemically active despite a temperature change, is electrochemically stable over the operating voltage range of a positive electrode (e.g. 4.0 V vs. Li/Li$^+$) and that oxide/SE interface was improved when the oxide is mixed with a LTFS of the invention.

Example 1: Method to Synthesize a Lithium Sulphide (LTFS) of the Invention

The compound $Li_{1.13}Ti_{0.3}Fe_{0.57}S_2$, hereafter called LTFS, was prepared by solid state reaction (Liu et al). For this purpose, 259.6 mg of $Li_2S$ (Alfa Aesar, 99 w/w %), 728.4 mg of $TiS_2$ (Sigma Aldrich, 99.9 w/w %) and 263.7 mg of FeS (Alfa Aesar, 99 w/w %) were weighed and homogeneously mixed and hand-grinded for 30 minutes. Afterwards, these precursor powders were filled in quartz tubes in an Ar-filled glovebox ($O_2$ and $H_2O$ level<1 ppm) followed by sealing the tube under vacuum ($\sim 10^{-5}$ mbar). The sealed tubes were subsequently annealed at 750° C. for 36 h followed by quenching in water. The resulting compound was collected inside a glovebox and hand-grinded for 10 minutes prior to storage and to further use. When the tube was exposed to ambient atmosphere, the air contact was avoided by sealing. Otherwise, the whole process was done inside the Ar-filled glovebox.

Example 2: Preparation of the Solid Electrolyte β-$Li_3PS_4$

The β-$Li_3PS_4$ solid electrolyte was obtained from $Li_2S$ and $P_2S_5$ via solution synthesis in tetrahydrofuran (THF): 328.07 mg of $Li_2S$ (Alfa Aesar, purity 99 w/w %) and 529 mg of $P_2S_5$ (Acros Organics, purity >98 w/w %) were weighed and homogeneously mixed by hand grinding for several minutes in an argon-filled glove box ($O_2$ and $H_2O$ level<1 ppm). The mixture was collected and suspended in 25 mL of THF (Sigma Aldrich, purity 99.9%) at room temperature.

The mixture was left for 3 days under continuous stirring. The solid was then recovered by centrifugation at 600 rpm for 3 minutes, and rinsed with pure THF. After rinsing, the wet powder was transferred to a glass tube, which was further introduced in a sand bath placed on top of a hot plate. The glass tube was then connected to Schlenk line (vacuum gas manifold) inside the glove box, and evacuated to a final pressure of around 0.1 mbar, in order to dry the sample.

The tube was then left at room temperature for 2 hours, and then heated at 100° C. for 24 hours to remove remaining THF. Finally, it was heated at 140° C. for 18 hours to obtain the final product of β-$Li_3PS_4$.

Example 3: Preparation of Positive Electrode Composite Materials According to the Invention The layered oxide used in the examples to make a positive electrode composite material is $LiNi_{0.6}Mn_{0.2}Co_{0.2}O_2$ (called hereafter NMC 622) having an average particle size of 10 μm with 99.9 w/w % of purity. It was provided by the company Umicore™' (Bruxelles, Belgium).

Within an argon-filled glove box, the LTFS obtained according to Example 1 and NMC 622 were mixed together (1:1 weight ratio) with hand grinding for 30 min, and further ball milling at 140 rpm for 30 min (powder to ball weight ratio 1:36, 1 g of power against 36 g of zirconia made balls, i.e. 12 balls of 3 g) in a planetary ball mill. The ball milling was performed outside the glovebox with the composite contained in two air tightened zirconia ball mill vessels.

Then, the Li-active sulphide β-$Li_3PS_4$ of example 2 was weighed to be added to the NMC622/LTFS mixture in the desired weight ratio (70% of NMC 622/LTFS and 30% of (β-$Li_3PS_4$). These components were then mixed by hand grinding with a mortar and pestle for 1 hour. This composite material was used to assemble the test battery B.

Another composite material according to the invention was obtained following the same steps used for the test battery B material, but without the use of a layered oxide material. Hence, the LTFS was added to the Li-active sulphide β-$Li_3PS_4$ of example 2 according to a weight ratio (70:30). This composite material was used to assemble the test battery A.

Another composite material according to the invention was obtained following the same steps as for test battery B, but with a different ratio of NMC 622/LTFS. In this material the weight ratio is not 1:1 as for test battery B, but 9:1. The mixture NMC 622/LTFS was added to the Li-active sulphide β-$Li_3PS_4$ of example 2 according to weight ratio 70:30 (70% of NMC 622/LTFS and 30% of (β-$Li_3PS_4$). This composite material was used to assemble the proof battery B.

Another composite material was obtained following the same steps, but without the use of LTFS. Hence, the NMC 622 was added to the Li-active sulphide β-$Li_3PS_4$ of example 2 according to a 70:30 weight ratio (70% of NMC 622/LTFS and 30% of ($\beta$-Li$_3$PS$_4$). This composite material was used to make the proof battery A.

Example 4: Pellet Assembling for Testing (See Example 6)

60 mg of each of the positive electrode composite materials of Example 3 were placed into a dye set and compressed applying 4 tons·cm$^{-2}$ with a hydraulic press during 5 minutes to form a pellet of 8 mm diameter and 0.3 mm thick. The pellets were then removed from the dye set.

Example 5: Cell Assembly

A home-made cell is used for battery assembling and testing (cycling and EIS) and for the heating and characterization (chronoamperommetry) of pelletized LTFS/NMC mixtures. The battery casing enables pressure monitoring and to operate at a temperature ranging from ambient temperature (about 20° C.)up to 170° C. (the maximum temperature inside the sleeve). The casing was used to provide the aforementioned heating treatment in situ to the sample instead of another ex situ heating treatment implying the direct manipulation of the sample, which could alter the results.

The Casing Structure

Figure 1:
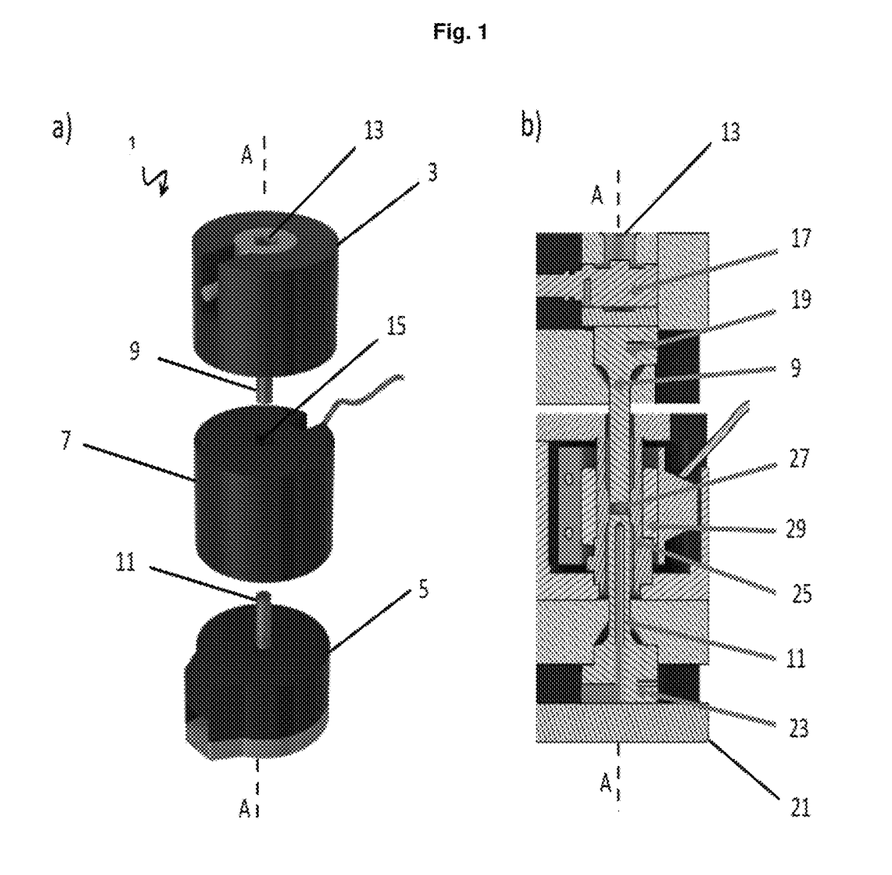
FIG. 1a shows an exploded perspective view of a device used to carry electrochemical measurements from an electrochemical cell, such as chronoamperometry, galvanostatic cycling and EIS measurements.
FIG. 1b is a cross sectional view of the device taken along the line AA.

The battery casing 1 can be described as the assembly of three cylinder-shaped separate elements better shown in FIG. 1a. These are:
an upper 3 and lower 5 pistons; and
a central body part 7.

The upper piston 3 comprises a top plunger 9 and the lower piston 5 comprises a lower plunger 11, both having a shape of a cylindrical rod, which extend along the longitudinal and central axis A. At the top of the upper piston 13 and at his centre, a nut 13 is located.

At the centre of the central bodypart 7, a hole 15 can accommodate the plungers 9, 11 from each piston 3 and 5. The three elements 3, 5 and 7 are assembled by introducing the plungers 9,11 into a hole 15 (provided within the central body part and having a diameter of about 8 mm)from both sides of the central body part 7, along the longitudinal axis A. The casing 1 can be closed or opened by simply inserting (or removing) the at least one of the plungers 9, 11 into (or from) the hole 15.

As shown in FIG. 1b, the upper piston 3 comprises, in a stacked relationship the nut $\beta$, a force sensor 17, the upper-plunger 9. The upper plunger 9 comprises a top electrical contact 19.

The lower piston 5 comprises, in a stacked relationship the bottom to the top, a base 21, a body and the lower plunger 11. The lower plunger 11 further comprises a bottom electrical connector 23.

The central bodypart 7 comprises, around the hole 15, an internal insulation sleeve 25 in a polymer material. The sleeve internal void is about of 8 mm diameter. When the plungers 9, 11 of each piston 3, 5 enter from the both sides of the body 7 into the hole 15, a cylindrical space 27 is created between the ends of each plungers 9, 11. The positive electrode material, a solid-electrolyte (SE) and a negative electrode forming an electrochemical cell can be placed within this space 27. A heating sleeve 29 is provided around internal sleeve 25 and is adapted to apply heat to space 27 and the electrochemical cell when located within the space 27.

Assembly Steps of the Electrochemical Cells

All the cells assemblies and tests were carried out in argon-filled glove box (O$_2$ and H$_2$O level<1 ppm).

The cell was assembled by sequential loading and pressing of each of its element at room temperature, without heating. The electrochemical cell comprises:
a solid-electrolyte (SE);
a positive electrode composite, comprising the materials according to the invention and the commercial oxide; and
a negative electrode made of indium-copper disk.

The indium-copper disk was made by spreading 10-15 mg of indium foil (Sigma Aldrich, purity 99%, thickness=0.127 mm) on one side of copper disk cut into 8 mm of diameter from a cupper foil (Goodfellow, purity 99.99%, thickness=0.02 mm). The negative electrode is originally made of indium, and is free of lithium at a pristine state. However, after the first charge, due to the delithiation of the positive electrode, lithium ions from the lithiated positive electrode form an InLi inter-metallic phase with indium, according to following reaction: In +Li$^+$+e$^-$=InLi and provide lithium at the negative electrode.

This way, when cell measurements are made, the negative electrode acts at the same time as counter and reference electrode, and the positive electrode is considered as the working electrode.

At the beginning of the assembly, the upper piston 3 of the casing 1 was removed. First, 30 to 35 mg of solid electrolyte$\beta$-Li$_3$PS$_4$, prepared from Example 2, were loaded inside the sleeve 25 and were homogeneously distributed onto the lower plunger 11 and within the space 27. The variation of the mass of the solid electrolyte in the above-mentioned range had no appreciable impact in the final result. Then, the casing 1 was closed by inserting the upper plunger 9 inside the sleeve 25. The casing 1 was vertically positioned in an hydraulic press (not represented) and a pressure of 1 ton·cm$^{-2}$ was applied for one minute (and monitored by a pressure sensor 17), and applied for 1 minute. A pellet of the solid-electrolyte was thus obtained.

Next, the upper piston 3 of thecasing 1 was removed, and 5-10 mg of one of the positive electrode composite materials were loaded and homogeneously spread onto the surface of the pre-compressed solid-electrolyte pellet. This amount was enough to cover the entire surface of the pellet. The casing 1 was closed and the plunger 9 was slowly pressed against the positive electrode composite materials with the hydraulic press (pressing rate: 0.4 tons·cm$^{-2}$ every 10 min) until reaching a value of 4 ton·cm$^{-2}$. This final pressure was maintained for 2 hours.

The casing 1 was taken out from the press, and the lower piston 5 was removed from the casing 1. The casing was turned over to itself and an indium-copper disk was placed within the space 27 so that the indium layer of the disk contacted the solid-electrolyte layer. The lower piston 5 was repositioned and the pressure needed to compact the cell applied: 0.5 ton/cm$^2$.

Once the battery is assembled within the sleeve, the cell is closed and the casing 1 is placed in a stainless steel frame (not represented). A bolt (not shown) was provided within the nut 13 and tightened with a screwdriver. This way, the casing was fixed to the frame and the pressure needed for cycling was provided.

Testing of the Electrochemical Cells

To carry out the cycling, once the desired pressure was set, the casing was connected to the Biologic (Seyssinet-Pariset, France) potentiostat/galvanostatmodelVMP-3 via the cables linking the inside and the outside of the glove box.

The conversion between V vs.(In—InLi)/Li$^+$ and V vs. Li/Li$^+$ scale was done by assuming that In—Li electrode potential remains stable once lithiated, and remains at 0.6 V vs. Li/Li$^+$.

The Following Cells were Assembled and Tested. Namely:

Test Battery a
  Positive electrode composite: LTFS/β-Li$_3$PS$_4$ composite (70:30 weight percent ratio)
  Solid electrolyte: β-Li$_3$PS$_4$, and
  Negative electrode: Li—In alloy (Indium onto a copper disk).

Test Battery B
  Positive electrode composite: NMC 622—LTFS (1:1 weight ratio) mixed by hand grinding with β-Li$_3$PS$_4$ in a 70:30 weight ratio (70% of NMC 622/LTFS mixture, 30% of (β-Li$_3$PS$_4$)
  Solid electrolyte: β-Li$_3$PS$_4$, and
  Negative electrode: Li—In alloy (Indium onto a copper disk).

Proof Battery a
  Positive electrode composite: NMC 622 mixed by hand grinding with β-Li$_3$PS$_4$ in a 70:30 weight ratio (70% of NMC 622, 30% of β-Li$_3$PS$_4$)
  Solid electrolyte: β-Li$_3$PS$_4$, and
  Negative electrode: Li—In alloy (Indium onto a copper disk)

Proof Battery B
  Positive electrode composite: NMC 622—LTFS (9:1 weight ratio) mixed by hand grinding with β-Li$_3$PS$_4$ in a 70:30 weight ratio (70% of NMC 622/LTFS mixture, 30% of (β-Li$_3$PS$_4$)
  Solid electrolyte: β-Li$_3$PS$_4$, and
  Negative electrode: Li—In alloy (Indium onto a copper disk).

Example 6: Preliminary Testing 1—Chemical Stability of the Interface Between Li-Active Oxide and Li-Active Sulphide The suitability and the chemical stability of the material was tested by measurements of X-ray diffraction analysis and chronoamperometry on a pellet made from the mixture NMC 622 and LTFS in a weight ratio of 1:1 (see Example 5), without β-Li$_3$PS$_4$,before and after being subjected to a heating treatment of 100° C. for 5 days under inert atmosphere (Argon gas). This temperature was chosen to accelerate the interface decomposition reactions.

Once the heat treatment was completed, the cell was left for cooling down to room temperature, and then chronoamperometry measurements were carried out on the heated pellet. Powders of pristine LTFS and NMC were used as XRD reference.

Heated and non-heated pellets of NMC 622 and LTFS were grinded and X-ray diffraction patterns were measured on the resulting powders.

Thus, the criterion used to define a stable interface is based on the comparison of X-ray diffraction patterns and electrical resistance of the pellet prior and after the heating treatment.

Structural Characterization of the Synthesized Powdered Compounds by X-Ray Diffraction (XRD) Analysis X-ray diffraction (XRD) measurements provide information on the crystal structure of characterized materials. The XRD patterns were collected using Bruker d8 advanced diffractometer. The following parameters were set to collect X-ray pattern data:

Detector slit=9.5 mm;
Beam slit=0.6 mm;
Range: 2θ=10°-50°;
X-ray wavelength=1.5406 Å(Angstroms) (CuKα);
Speed: 211 s/step;
Increment: 0.015°.

Figure 2:
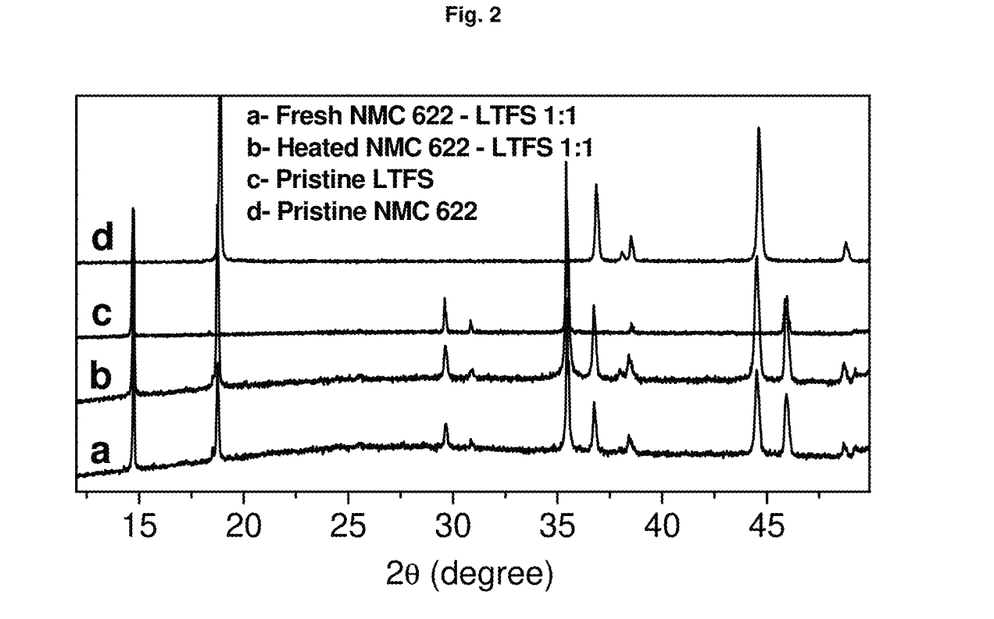
FIG. 2 shows the powder X-ray diffraction (XRD) patterns of an NMC 622/LTFS powdered mix, the same composite after a heat treatment, and LTFS and NMC 622 powders.

As shown in FIG. 2, no significant changes in the structure of the materials ("Fresh NMC 622— LTFS 1:1" and "Heated NMC 622— LTFS 1:1") were evidenced, before and after heating, in terms of number of peaks, position, width and intensity.

Therefore, this result shows that the crystal structure of the characterized material remains stable after the heat treatment.

Chronoamperometry (CA)Measurements

In chronoamperometry, the current is measured as a function of time after application of a potential step. A pellet made from the mixture NMC 622 and LTFS in a weight ratio of 1:1 was submitted to potential which was increased every 10 seconds by jumps of 0.01 V, this for 10 times. At each potential jump, a stationary current was determined.

Figure 3:
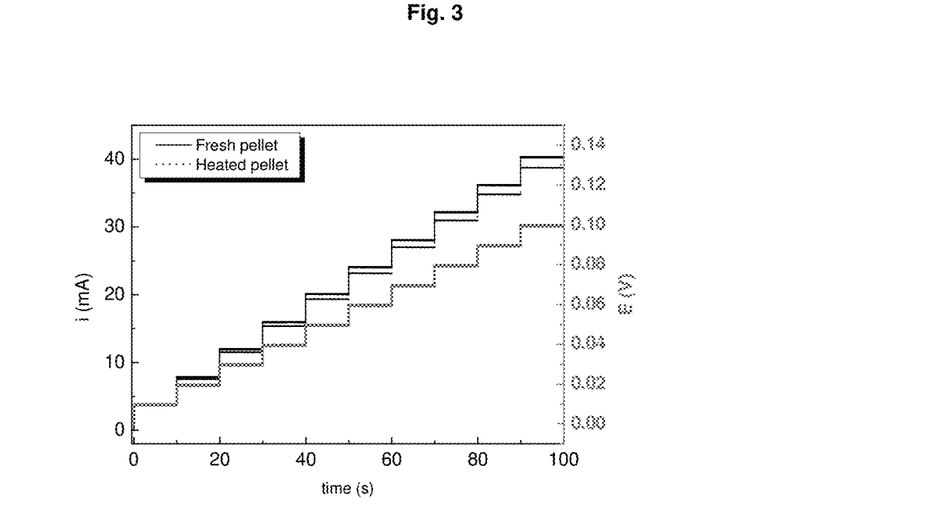
FIG. 3 shows the current against time plot of a cell of an NMC 622/LTFS mix pellet (1:1 weight ratio) before (black line) and after (red line) a heating treatment.

The results are shown in FIG. 3. A small shift in current from the third potential step may be due to a change in the temperature inside the glovebox (as each curve was measured on different day (5 days separating the two measurements). However, the variation is small enough to be ascribed to this temperature change. Therefore, the resistance is not substantially impacted.

Figure 4:
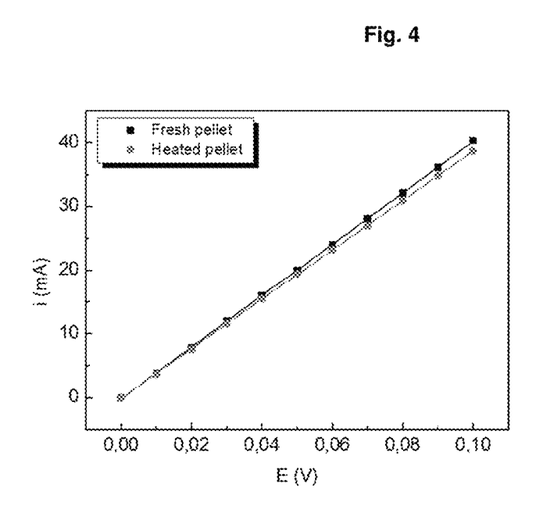
FIG. 4 shows the plot of stationary current determined from FIG. 3, against the applied potential, for the NMC 622/LTFS mix pellet.

FIG. 4 shows of the plotted graph of stationary current against the applied potential. The electrical resistance was determined as the inverse of the slope of the graph of FIG. 4. No significant changes in the electrical resistance of the pellets were observed before (2.48Ω) and after heating (2.57Ω) at 100° C. The specific conductivity σ was determined using the following relationship σ=L/(A*R), where L and A are respectively the thickness and area of the pellet, R is the electrical resistance of the pellet determined from the slope. The dimensions of the pellets remain the same (diameter=8 mm, thickness=0.3 mm) during the measurements. The specific conductivity σthus remains stable at 0.02 S.cm$^{-1}$ as it only varies of 0.001 S.cm$^{-1}$ before and after the heat treatment. An unaltered electrical conductivity would mean no formation of resistive interlayer of decomposition products and therefore, no interface reaction. The stability of electric conductivity despite the heat treatment is therefore indicative of the stable interface between the oxide NMC 622 and the NTFS.

In view of the results of XRD and CA measurements, it can be considered that the interface between the oxide NMC 622 and LTFS remains stable despite the heating.

Example 7: Preliminary Testing of a Material According to the Invention—Galvanostatic Cycling to Test Electrochemical Activity of the Li-Active Sulphide In order to test the electrochemical activity of LTFS, the positive electrode composite used in Test Battery A was assembled according to example 5, using the positive electrode comprising the mixture of LTFS and of β-Li$_3$PS$_4$ in a 70:30 weight ratio,β-Li$_3$PS$_4$ as solid electrolyte and Li—In alloy as the negative electrode.

After a resting period of 5 hours at open circuit, the cell was cycled at a rate of C/50 between 1.9V and 3.0V vs. Li/Li$^+$, 4 cycles each at following temperatures: room temperature, 45° C., 75° C., and 105° C.

Figure 5:
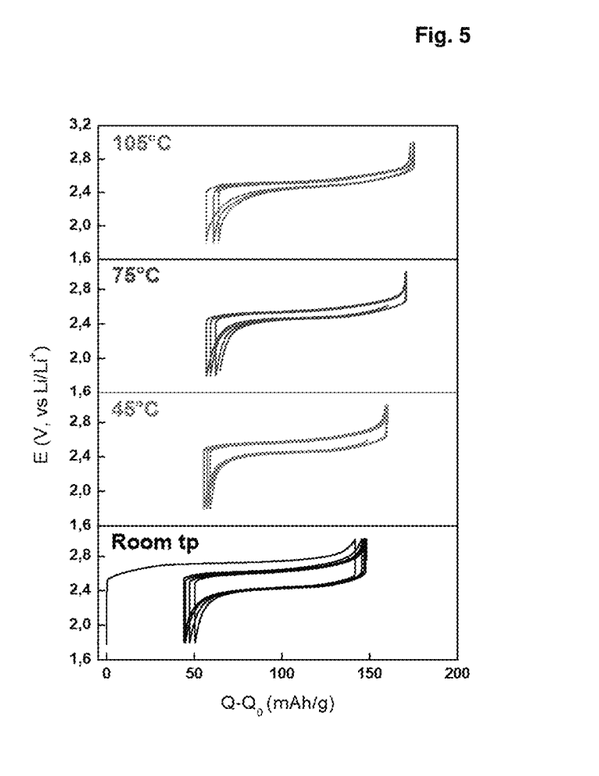
FIG. 5 shows a galvanostatic cycling curve at C/50 rate of a cell made from a mixture of LTFS and $Li_3PS_4$ in 70:30 weight ratios, cycled at different temperature regimes (room temperature, 45, 75, 105° C.).

As shown in FIG. 5, an irreversibility, (which can be possibly ascribed to the formation of side products at the solid electrolyte-electrode interface) was observed only during the first cycle and this phenomenon was observed in all the first cycles at all of the temperatures tested. The overvoltage was measured at a plateau observed at the potential around 2.4 V. This value was at:
Room Tp: 196 mV
45° C.: 135 mV
75° C.: 100 mV
105° C.: 61 mV.

The overvoltage decreases as the temperature increases. It does not exceed 200 mV regardless of the above-mentioned temperature regimes. Furthermore, the capacity retention observed remains above 90% over 16 cycles. Hence reversible cycling was demonstrated and shown to be favoured by the increase of temperature as this is evidenced by smaller polarization (i.e. overpotential).

Example 8: Electrochemical Characterization 1—Galvanostatic Cycling to Test Electrochemical Stability of the Li-Active Sulphide LTFS Over the Operating Voltage Range of a Commercialized Li-Active Oxide In this example, the galvanostatic cycling was carried out over the operating voltage range in two steps, in order to test:
the electrochemical stability of solely the LTFS combined with the solid-electrolyte $\beta$-Li$_3$PS$_4$ (test battery A); and
the electrochemical stability of the LTFS mixed with solid-electrolyte $\beta$-Li$_3$PS$_4$ and with a commercialized oxide (test battery B).

For this purpose, two solid state batteries were assembled following the same procedure for battery assembling which is described in Example 5.

The electrochemical analyses were carried out in an argon-filled glovebox (O$_2$ and H$_2$O level <1 ppm) with Biologic (Seyssinet-Pariset, France) potentiostat/galvanostatmodelVMP-3.

Test Battery a

This battery was tested to show the electrochemical stability and suitability of the selected sulphide material per se at the operational voltage of the oxide material. The details of each component of such a cell, already described in example 5, are as follows.
Positive electrode composite: LTFS-$\beta$-Li$_3$PS$_4$ composite (70:30 weight percent ratio)
Solid electrolyte: $\beta$-Li$_3$PS$_4$
Negative electrode: Li—In alloy (Indium onto a copper disk)

After a resting period of 5 hours at open circuit, this battery was cycled at room temperature, at a cycling rate of C/50 within the voltage window of 1.9V-4.3 V vs. Li/Li$^+$.

Figure 6:
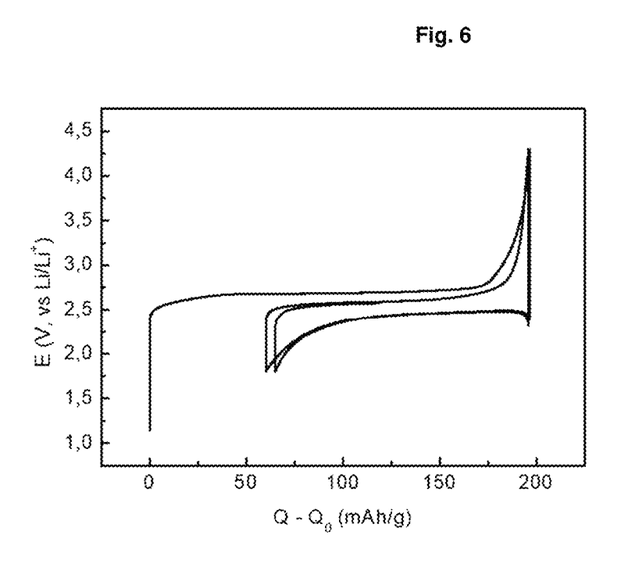
FIG. 6 shows a galvanostatic cycling curve (Potential against specific capacity) at C/50 rate of the test battery A.

As shown in FIG. 6, except for the above-mentioned irreversibility from the first cycle, no significant variation in terms of the specific capacity (mAh·g$^{-1}$) is observed and the shape of the curve remains stable. In particular the capacity (~200 mAh·g$^{-1}$) at the upper limit potential (near 4.3 V vs. Li/Li$^+$) remains stable over 3 cycles.

This result illustrates that LTFS can withstand the voltage window of the commercialized oxide NMC 622.

Test Battery B

This battery was tested to show the electrochemical stability of the selected Li-active sulphide LTFS in presence of a Li-active layered oxide at the operational voltage of said oxide. The selected Li-active oxide was LiNi$_{0.6}$Mn$_{0.2}$Co$_{0.2}$O$_2$ (NMC 622).

The details of each component of such a cell, already described in example 5, are as follows:

Positive electrode composite: NMC 622— LTFS (1:1 weight ratio) mixed by hand grinding with $\beta$-Li$_3$PS$_4$ in a 70:30 weight ratio (70% of NMC 622/LTFS mixture, 30% of ($\beta$-Li$_3$PS$_4$);
Solid electrolyte: $\beta$-Li$_3$PS$_4$;
Negative electrode: Li—In alloy (Indium onto a copper disk).

After a resting period of 5 hours at open circuit, this battery was cycled at room temperature, at a cycling rate of C/50 and in a voltage window of 1.9V-4.3 V vs. Li/Li$^+$.

Figure 7:
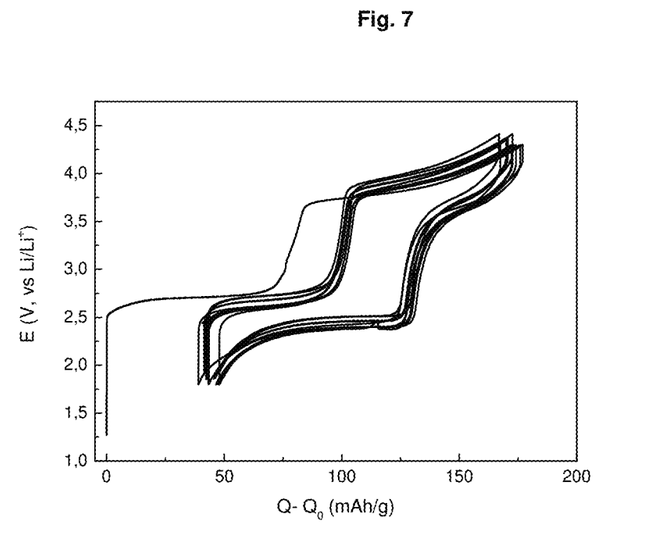
FIG. 7 shows a galvanostatic cycling curve (Potential against specific capacity) at C/50 rate of the test battery B.

In reference to FIG. 7, the potential against capacity plot exhibits two zones. Between 1.9-2.5 V vs. Li/Li$^+$, LTFS is electrochemically active, while NMC 622 is active in the range 3-4.3V vs. Li/Li$^+$. In both well differentiated potential ranges, a good reversibility of the materials (LTFS and NMC) that are part of the electrode of the test battery B is observed.

Figure 8:
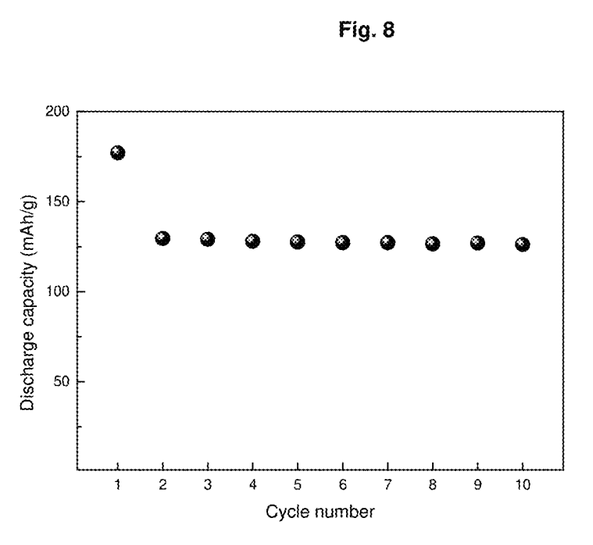
FIG. 8 shows a specific capacity ($mAh·g^{-1}$) evolution over cycles for test battery B obtained in the same condition as FIG. 7.

FIG. 8 shows the evolution of the specific capacity evolution of the test battery B at delithiated state over 10 cycles. But for the irreversibility between the first and second cycles, the capacity remains stable at 125 mAh·g$^{-1}$. the specific capacity evolution of the test battery B, at delithiated state over 10 cycles, is represented.

These results demonstrate that Li-active sulphide LTFS is electrochemically stable, when mixed with the commercialized Li-active oxide, over the operating voltage range of the oxide.

Example 9: Electrochemical Characterization 2—Superiority of the Commercialised Li-Active Oxide Mixed with the Li-Active Sulphide LTFS Over the Oxide without the LTFS Two solid state batteries were built, one of them not containing LTFS in the positive electrode material (Proof battery A) and the other one having a mixture of both Li-active oxide and Li-active sulphide(LTFS) materials as a positive electrode (Proof battery 8). In both cases, the electrochemical testing was done in the operational voltage of the oxide NMC 622, i.e. 2.6-4.3 V vs. Li/Li$^+$.

The details of each component of such cells, already described in example 5, are as follows:
Proof Battery a without LTFS
Positive electrode composite: NMC 622 mixed by hand grinding with $\beta$-Li$_3$PS$_4$ in a 70:30 weight ratio (70% of NMC 622, 30% of ($\beta$-Li$_3$PS$_4$))
Solid electrolyte: $\beta$-Li$_3$PS$_4$
Negative electrode: Li—In alloy (Indium onto a copper disk)
Proof Battery B
Positive electrode composite: NMC 622—LTFS (9:1 weight ratio) mixed by hand grinding with $\beta$-Li$_3$PS$_4$ in a 70:30 weight ratio (70% of NMC 622/LTFS mixture, 30% of ($\beta$-Li$_3$PS$_4$))
Solid electrolyte:$\beta$-Li$_3$PS$_4$
Negative electrode: Li—In alloy (Indium onto a copper disk)

Figure 9:
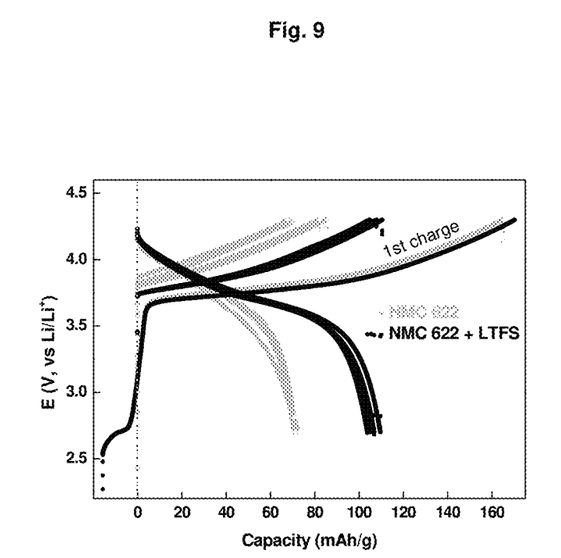
FIG. 9 shows a galvanostatic cycling curve (Potential against specific capacity) at C/50 rate of the proof batteries A and B.

After a resting period of 5 hours at open circuit, both batteries Proof A and Proof B were tested at room temperature, for 5 cycles each, at a cycling rate of C/50 and within a voltage window of 2.1-4.3 V vs. Li/Li$^+$. FIG. 9 shows that the NMC 622/LTFS 9:1 mixture (proof battery B) exhibited an improved cycling performance in terms of reversible capacity (111 mAh·g$^{-1}$ for Proof Battery B against 71 mAh·g$^{-1}$ for Proof Battery A) and overvoltage (polarization at 130 mAh/g: 180 mV for Proof Battery B and 300 mV for Proof Battery A). The beneficial effect of LTFS is therefore demonstrated.

Example 10: Electrochemical Characterization 3—Electrochemical Impedance Spectroscopy (EIS)

Proof Battery A and Proof Battery B were used to carry out electrochemical impedance spectroscopy (EIS). The EIS measurements consist of exciting an electrochemical system with a sinusoidal electric signal around at a fixed value, i.e. a fixed potential or current. By detecting the response of such a sinusoidal signal of the system, it is possible to observe the impedance evolution (Z=V/I, in complex unit). The higher the impedance, the more resistive the interface is. Another advantage of this technique lies in possibility to distinguish phenomena occurring within the electrochemical cell by frequency ranges. Furthermore, the EIS can be considered as non-destructive for a low amplitude signal.

Figure 10:
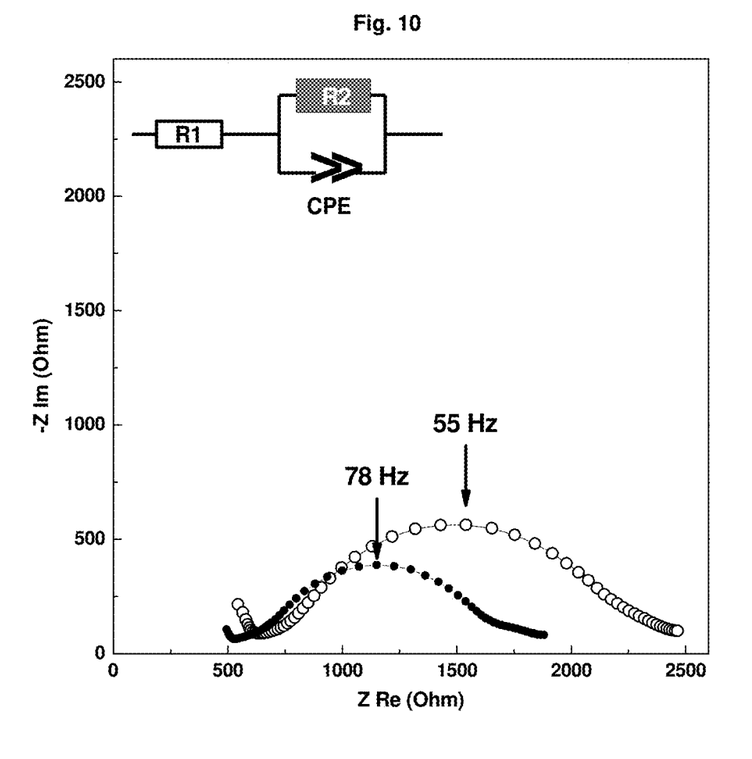
FIG. 10 shows electrochemical impedance spectroscopy (EIS) spectra of Proof battery A and of Proof battery B obtained after the first charge (at a delithiated state).

In this example, the amplitude of excitation signal was chosen to be 10 mV, potential mode. In order to avoid the evolution of the electrochemical system during the measurements, the EIS spectra were obtained in a frequency range of 100 KHz-100 MHz to probe the cathode-solid-electrolyte interfaces at the end of first charge (at delithiated state) at C/50 rate, 16 points per decade. The measurement was done after 15 minutes of relaxation and at an OCV of around 3.9 V for proof battery A (NMC) and around 4.1V for proof battery B (NMC/LTFS). FIG. 10 shows the evolution of impedance Z in Nyquist plan (-Im(Z) vs. Re(Z)). A semicircle represents a contribution from different region of the electrochemical cell according to the frequency range.

For example,
At a middle frequency range (frequency ranging from 100 mHz to 100 kHz): phenomena occurring at solid-electrolyte and positive electrode interfaces
At a lower frequency range (lower than 100 mHz): phenomena occurring at solid-electrolyte and negative electrode interface (not represented)
At a higher frequency range higher than 100 kHz: phenomena occurring near the electrolyte (not represented) (cf. Zhang et al.).

The curves shown in FIG. 10 are the ones corresponding to the middle frequency range and thus to the interfaces between the solid-electrolyte and the positive electrode-composite. The result shows clearly that the radius and the shape of the curves is smaller for proof battery B compared to that of proof battery A, indicating a less resistive cathode/SE interface for proof battery B. These results are in line with the galvanostatic measurements results carried out in example 9.

CITED REFERENCES

1. Janek, J. et al. A solid future for battery development. Nat. Energy 1, 16141 (2016).
2. Kanno, R. et al. Lithium Ionic Conductor Thio-LISICON: The $Li_2S$—$GeS_2$—$P_2S_5$ System. J. Electrochem. Soc.148, (2001).
3. Kamaya, N. et al. A lithium superionic conductor.Nat. Mater.10, 682-686 (2011).
4. Koerver, R. et al.Redox-active positive electrode interphases in solid-state batteries. J. Mater. Chem. A5, 22750-22760 (2017).
5. Takada, K. et al. Interfacial phenomena in solid-state lithium battery with sulphide solid electrolyte. Solid State Ionics 225, 594-597 (2012).
6. Haruyama, J. et al. Space—Charge Layer Effect at Interface between Oxide Positive electrode and Sulfide Electrolyte in All-Solid-State Lithium-Ion Battery. Chem. Mater.26, 4248-4255 (2014).
7. Culver, S. P. et al. On the Functionality of Coatings for Positive electrode Active Materials in Thiophosphate-Based All-Solid-State Batteries. Adv. Energy Mater. (2019). doi:10.100$^2$/aenm.201900626
8. Xiao, Y., Miara, L. J., Wang, Y. & Ceder, G. Computational Screening of Positive electrode Coatings for Solid-State Batteries. Joule(2019). doi:10.1016/j.joule.2019.02.006
9. Liu, Z. et al. Anomalous high ionic conductivity of nanoporous β-$Li_3PS_4$. J. Am. Chem. Soc.135, 975-978 (2013).
10. Busche, M. R. et al.In Situ Monitoring of Fast Li-Ion Conductor $Li_7P_3S_{11}$ Crystallization Inside a Hot-Press Setup. Chem. Mater.28, 6152-6165 (2016).
11. Zhang, W. et al. Interfacial Processes and Influence of Composite Positive electrode Microstructure Controlling the Performance of All-Solid-State Lithium Batteries. ACS Appl. Mater. Interfaces 9, 17835-17845 (2017).
12. Takada, K, et al. Lithium iron sulphide as an electrode material in a solid state lithium battery. Solid State Ionics, Volume 117, Issues 3-4, 2 Feb. 1999, Abstract.

The invention claimed is:

1. A method of manufacturing a positive electrode of a solid state battery, comprising providing a transition metal sulphide compound of formula III: $Li_{1.33-2y/3} M_{0.67-y/3} N_y S_2$ (III) in association or combination with an oxide compound, as an active material for said positive electrode of a solid state battery, wherein MN is a combination of two or more transition metals, Li, M and N have each an atomic content dependent upon y, as shown in formula III, y being a number strictly superior to 0 and not superior to 0.5.

2. The method according to claim 1, wherein said transition metals are chosen in the group consisting of Titanium, Iron, Manganese, Nickel, Vanadium and a combination thereof.

3. The method according to claim 1, wherein said oxide compound is of the empiric formula $A_x C_c O_z$ wherein A is an alkali, C comprises at least one element from the Group 2 to Group 13, O is oxygen, 0<x<3, c is a number ranging from 1 to 3 and z is equal to x+c.

4. A composite material comprising a ternary transition metal sulphide compound of formula III: $Li_{1.33-2y/3} M_{0.67-y/3} N_y S_2$ (III) and oxide compound, wherein MN is a combination of two or more transition metals, Li, M and N have each an atomic content dependent upon y, as shown in formula III, y being a number strictly superior to 0 and not superior to 0.5.

5. An electrochemical cell comprising at least a positive and a negative electrode in contact with an electrolyte material, wherein said positive electrode comprises, consists or essentially consists of the composite material according to claim 4.

6. A solid state battery which comprises at least one electrochemical cell as claimed in claim 5 and external connections.

7. The solid state battery according to claim 6, wherein said battery is cyclable in an allowed cut-off voltage range of 1.5-4.5 V vs. Li/Li.

8. A method of manufacturing a positive electrode of a solid state battery, comprising providing a ternary transition metal sulphide compound of formula III: $Li_{1.33-2y/3} M_{0.67-y/3} N_y S_2$ (III) as an active material for said positive electrode of a solid state battery, wherein MN is a combination of two or more transition metals, Li, M and N have each an atomic content dependent upon y, as shown in formula III, y being a number strictly superior to 0 and not superior to 0.5.

9. The method of claim 8, wherein said transition metal of said ternary transition metal sulphide is chosen in the group consisting of Titanium, Iron, Manganese, Nickel, Vanadium and a combination thereof.

10. The method according to claim 8, wherein the method includes mixing said ternary transition metal sulphide compound in a powder form with a solid electrolyte material which is also in a powder form.

11. A positive electrode for a solid state battery, said electrode comprising a ternary transition metal sulphide of formula III: $Li_{1.33-2y/3} M_{0.67-y/3}N_yS_2$ (III) and, wherein MN is a combination of two or more transition metals, Li, M and N have each an atomic content dependent upon y, as shown in formula III, y being a number strictly superior to 0 and not superior to 0.5.

12. An electrochemical cell which comprises at least one positive electrode and one negative electrode in contact with an electrolyte material, wherein said positive electrode is as defined in claim 11.

13. A method of manufacturing a positive electrode of a solid state electrochemical cell, comprising providing a ternary transition metal sulphide compound of formula III:
$Li_{1.33-2y/3} M_{0.67-y/3}N_yS_2$ (III), wherein MN is a combination of two or more transition metals, Li, M and N have each an atomic content dependent upon y, as shown in formula III, y being a number strictly superior to 0 and not superior to 0.5, as an active material of said positive electrode.

14. An electrochemical cell comprising at least a positive and a negative electrode in contact with a solid electrolyte, wherein said positive electrode comprises, consists or essentially consists of a ternary transition metal sulphide compound of formula III:
$Li_{1.33-2y/3} M_{0.67-y/3}N_yS_2$ (III), wherein MN is a combination of two or more transition metals, Li, M and N have each an atomic content dependent upon y, as shown in formula III, y being a number strictly superior to 0 and not superior to 0.5.

15. A solid state battery which comprises at least one electrochemical cell as claimed in claim 14 and external connections.

16. The composite material according to claim 4, wherein said transition metal of said transition metal sulphide is chosen in the group consisting of Titanium, Iron, Manganese, Nickel, Vanadium and a combination thereof.

17. The composite material according to claim 4, wherein said oxide compound is of the empiric formula $A_xC_cO_z$ wherein A is an alkali, C comprises at least one element from the Group 2 to Group 13, O is oxygen, 0<x<3, c is a number ranging from 1 to 3 and z is equal to x+c.

18. The positive electrode of claim 11, wherein said transition metal of said ternary transition metal sulphide is chosen in the group consisting of Titanium, Iron, Manganese, Nickel, Vanadium and a combination thereof.

19. The positive electrode of claim 11, wherein said ternary transition metal sulphide compound in a powder form is mixed with a solid electrolyte material which is also in a powder form.

* * * * *